US006449124B1

(12) United States Patent
Hoyle

(10) Patent No.: US 6,449,124 B1
(45) Date of Patent: Sep. 10, 2002

(54) COMPUTER DISKETTE WITH INSERTABLE MULTI-PIECE MEDIA

(75) Inventor: Martin David Hoyle, Destrehan, LA (US)

(73) Assignee: B.E. Technology, LLC, Bay City, MI (US)

( * ) Notice: Subject to any disclaimer, the term of this patent is extended or adjusted under 35 U.S.C. 154(b) by 0 days.

(21) Appl. No.: 09/627,632

(22) Filed: Jul. 28, 2000

Related U.S. Application Data

(62) Division of application No. 08/950,546, filed on Oct. 15, 1997, now Pat. No. 6,122,145.

(51) Int. Cl.⁷ ............................................. G11B 23/03
(52) U.S. Cl. ..................................... 360/133; 369/291
(58) Field of Search ........................ 360/133; 369/290, 369/291, 280, 282, 289

(56) References Cited

U.S. PATENT DOCUMENTS

| | | | | |
|---|---|---|---|---|
| 3,325,916 A | * | 6/1967 | Greenlee ..................... | 369/271 |
| 4,628,388 A | * | 12/1986 | Kawabe ....................... | 360/128 |
| 4,639,813 A | * | 1/1987 | Uno ............................. | 360/128 |
| 4,665,457 A | * | 5/1987 | Odawara et al. ............ | 360/133 |
| 4,774,618 A | * | 9/1988 | Raviv .......................... | 360/133 |
| 4,829,510 A | * | 5/1989 | Takahashi .................... | 369/290 |
| 4,910,624 A | * | 3/1990 | Peeters ........................ | 360/133 |
| 4,944,982 A | * | 7/1990 | Kikuchi ....................... | 428/64.4 |
| 4,982,399 A | * | 1/1991 | Odawara et al. ............ | 369/270 |
| 5,323,381 A | * | 6/1994 | Takahashi et al. .......... | 369/282 |
| 5,369,632 A | * | 11/1994 | Takahashi .................... | 369/282 |
| 5,438,564 A | * | 8/1995 | Takahashi .................... | 369/290 |
| 5,485,338 A | * | 1/1996 | Harmon ....................... | 360/133 |
| 5,504,735 A | * | 4/1996 | Ota et al. ..................... | 360/135 |
| 5,506,740 A | * | 4/1996 | Harmon ....................... | 360/133 |
| 5,579,297 A | * | 11/1996 | Childers et al. ............ | 369/291 |
| 5,719,851 A | * | 2/1998 | Yen .............................. | 369/291 |
| 5,774,446 A | * | 6/1998 | Borsadia ..................... | 369/274 |
| 5,852,598 A | * | 12/1998 | Wiest .......................... | 369/272 |
| 5,859,834 A | * | 1/1999 | Takahashi et al. .......... | 369/290 |
| 5,867,477 A | * | 2/1999 | Naito et al. ................. | 369/290 |
| 6,122,145 A | * | 9/2000 | Hoyle .......................... | 360/133 |
| 6,167,023 A | * | 12/2000 | Davis et al. ................. | 369/290 |

FOREIGN PATENT DOCUMENTS

JP              1-107388     * 4/1989

\* cited by examiner

*Primary Examiner*—Brian E. Miller
(74) *Attorney, Agent, or Firm*—Reising, Ethington, Barnes, Kisselle, Learman & McCulloch, P.C.

(57) ABSTRACT

A computer diskette system utilizes a pair of partial disks which mate together to form a complete data storage disk that can be read in a conventional manner by a computer disk drive. When mated together, the partial disks are mounted in a diskette that comprises a cartridge for holding the partial disks and a hub rotatably mounted in an opening in the lower wall of the cartridge. The hub has a center hold for receiving a drive spindle of the computer disk drive and, within the cartridge, has an interlocking portion to which the partial disks can be attached. The hub and partial disks can have radially-extending interlocking elements that prevent the disks from slipping on the hub when it is being driven by the disk drive. The cartridge has an access door for inserting and removing the partial disks. A first one of the two partial disks contains conventional formatting information which identifies the locations of data on the second partial disk. The second partial disk can then be used to store business contact information as one or more preselected files that are common to all such partial disks and that information can then be retrieved in a conventional manner using the formatting information contained on the first partial disk. A computer program can be used to access and use the data stored on the second partial disk. In another embodiment, the second partial disk attaches to the first partial disk which is permanently mounted on the hub.

12 Claims, 5 Drawing Sheets

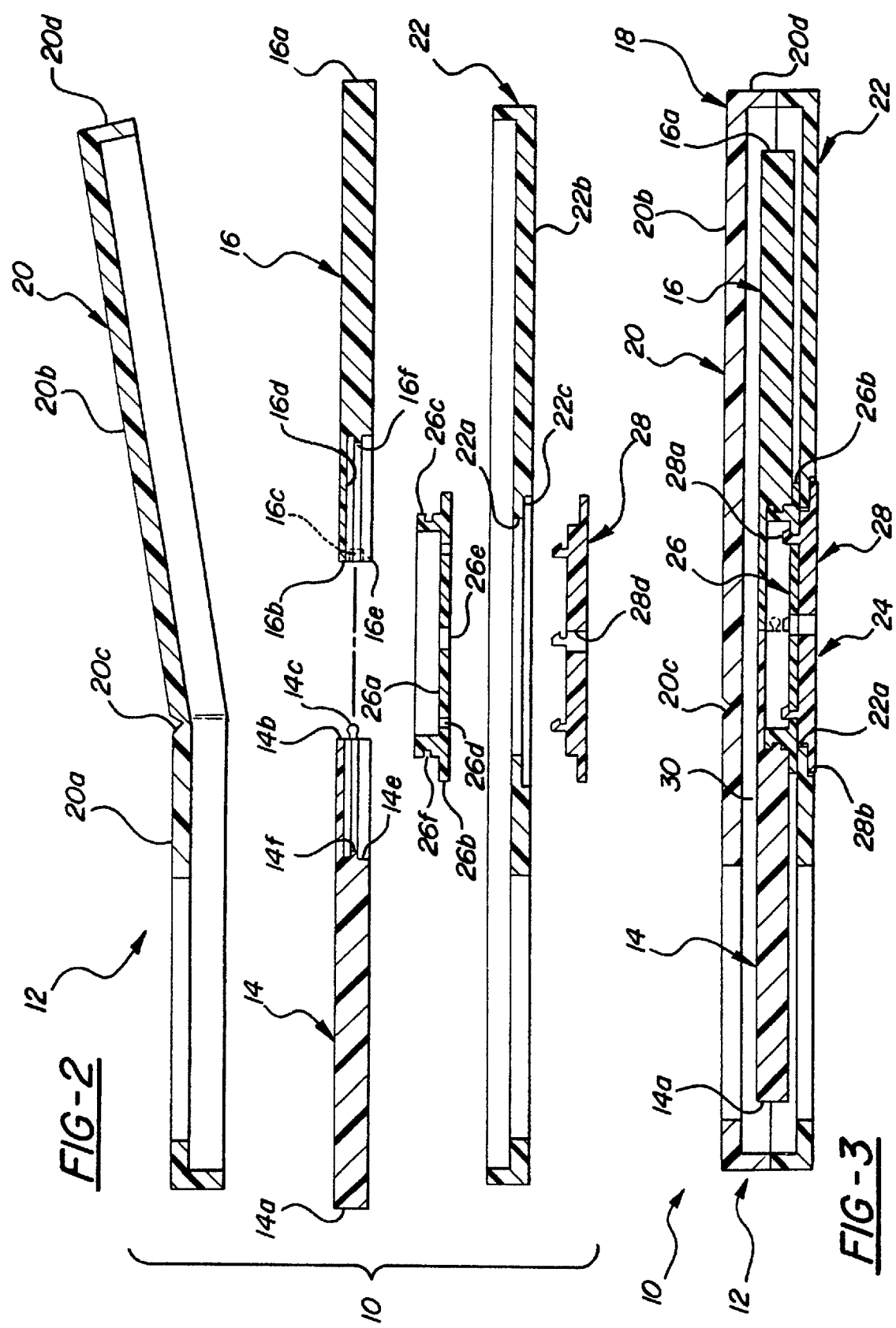

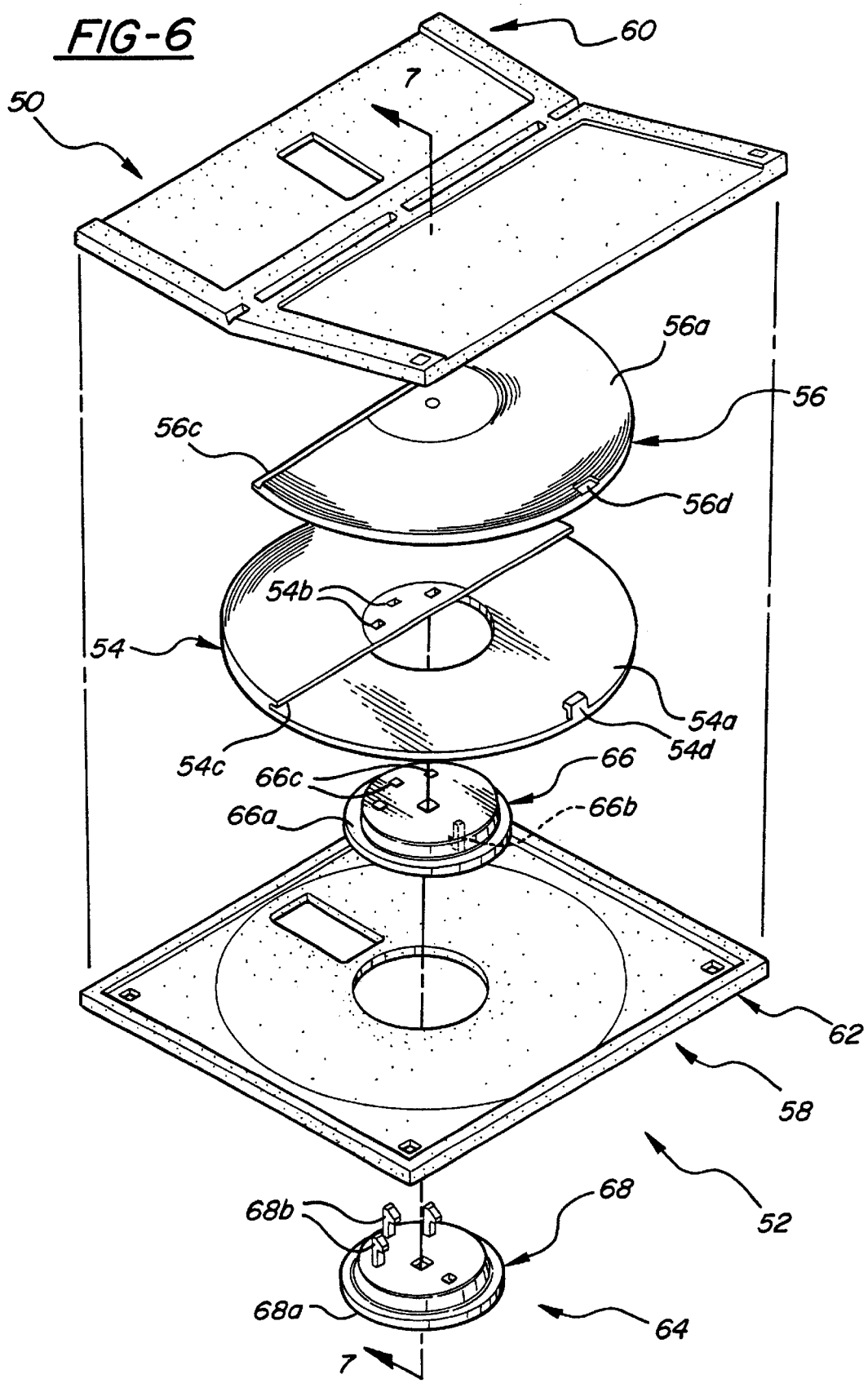

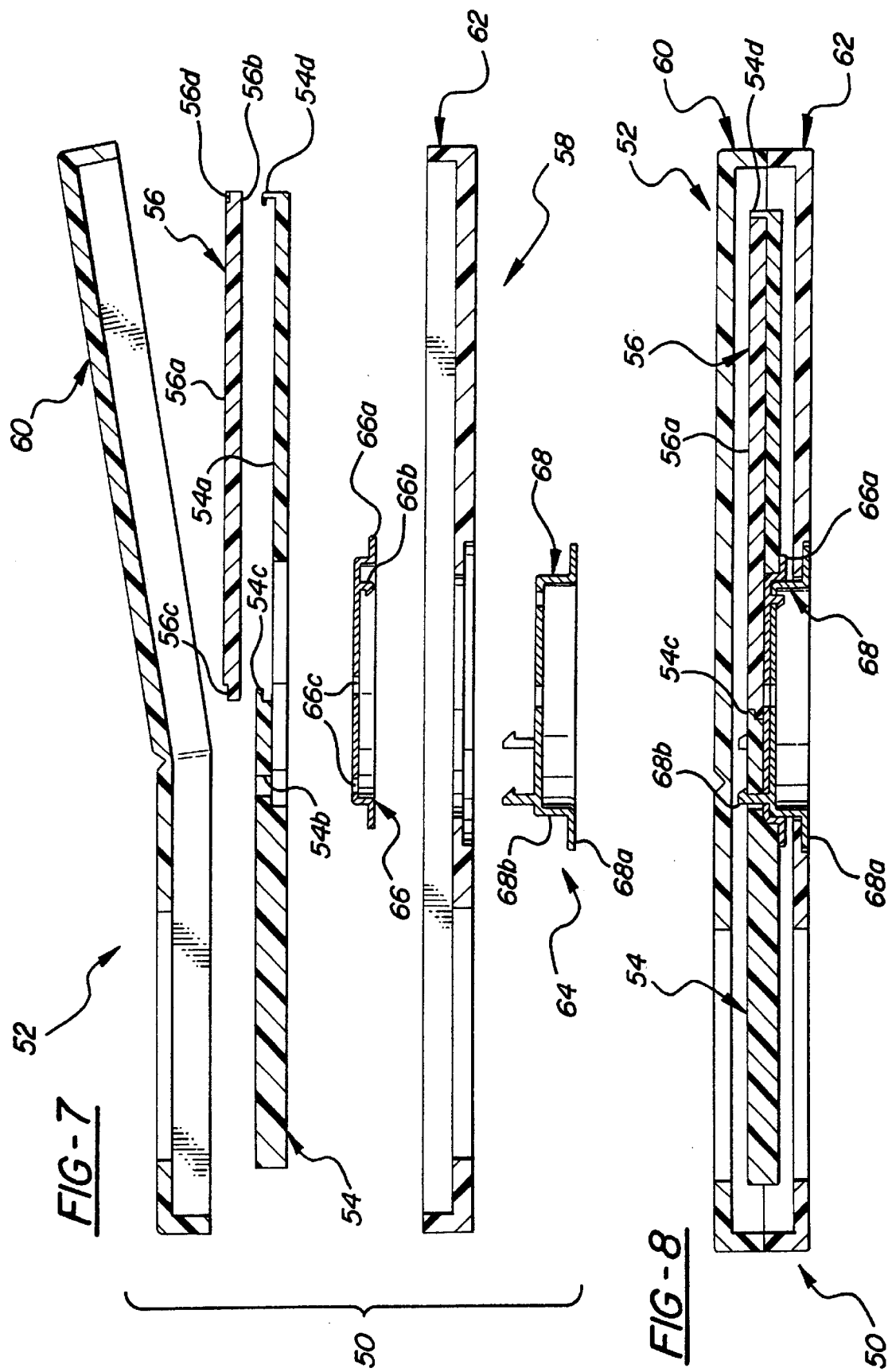

COMPUTER DISKETTE WITH INSERTABLE MULTI-PIECE MEDIA

CROSS-REFERENCE TO RELATED APPLICATION

This application is a divisional of U.S. Ser. No. 08/950,546, filed Oct. 15, 1997 now U.S. Pat. No. 6,122,145.

TECHNICAL FIELD

This invention relates to computer diskettes and to systems for distributing computer readable data on diskettes.

BACKGROUND OF THE INVENTION

In virtually every business sector there exists the need for individuals to provide others with business-related information. Such information can include rudimentary information (e.g., the person's name, business address, and other contact information), as well as information relating to a company's products and services. Over time, various practices for the distribution and utilization of such information have become standardized throughout the business community. Traditionally, these practices have included such things as the use of business cards to provide a simple means of distributing contact information, the use of manual rolodexes for the orderly storage and access to that contact information, and the use of printed brochures and technical data sheets to provide information about a company's products or services.

More recently, computers have been used in the distribution and management of such business information. Information is now commonly distributed by facsimile transmission and over the Internet via email and the World Wide Web and, to a lesser degree, over private extranets. This information is now commonly stored and managed by a computer, using special purpose programs such as an electronic rolodex or address book to manage the information.

Computer diskettes such as floppy disks were originally developed to store computer readable information, such as program code and data, and to permit the simple transfer of that information between different computers. The first widely used floppy disks were approximately 8 inches square. Thereafter, 5¼ inch disks became widely used and today, the most commonly used floppy disks are 3½ inches square and store approximately 1.44 Megabytes of information. While these diskettes can and have been used to distribute all the various types of business information, their use for this purpose has not gained widespread acceptance. This has been due in part to the physical size of the diskettes and in part to the fact that computers are not universally present in all businesses and are not always compatible with one another. However, as the physical size of the diskettes has shrunk to the point where they can be easily mailed and transported and as the number of compatible computers increases, the use of diskettes to distribute certain types of business information has increased. For example, diskettes are now commonly used in direct mail advertising to provide demonstrations of software and to provide access to various on-line computer services.

Notwithstanding these advances, other types of business information are still distributed primarily in printed form. For example, business cards remain the primary vehicle for distribution of contact information. While prevalent, this means of distributing information has several disadvantages. First, the amount of basic information that must be shared is often more than is desired or capable of fitting on a business card. Whereas individuals have traditionally communicated via the post office mail or by voice telephone, they now have a variety of additional methods by which they can communicate, including by cell phone, fax, pager, email, and via a website. Second, since many people now manage this contact information with a computer, information received in printed form must be manually entered into the computer, thereby wasting time and human resources. There is also a risk of error in the manual entry of the information, a problem which is exacerbated by the fact that even a single erroneous alphanumeric character can render a piece of contact information useless. Third, additional business information, such as data and software required to access on-line computer services, cannot be included with the information contained on the business card.

One technique for the distribution of computer readable contact information is disclosed in U.S. Pat. No. 4,774,618, issued Sep. 27, 1988 to A. Raviv. The method and apparatus disclosed therein involves storing data on a magnetic strip that can be attached to a business card and thereafter removed by a recipient of the business card. The magnetic strip is then placed onto a floppy diskette that can then be inserted into a computer's floppy drive. The floppy diskette can include a jacket and a plastic carrier disk rotatably mounted to the jacket. The magnetic strip is attached to the plastic carrier and, when the diskette is placed into the disk drive the magnetic strip is rotated with the plastic carrier past the disk drive's read/write head. This techniques suffers from a number of disadvantages. Since the plastic carrier disk itself has no magnetic media, any file allocation table or other formatting information must be stored on the small magnetic strip itself, thereby limiting the amount of information that can be stored on the magnetic strip. Also, when being adhered to the plastic disk, the magnetic strip must be accurately aligned so that the tracks on the strip are concentric with the axis about which the plastic carrier rotates.

Accordingly, there exists a need for a system of distributing contact and other such business information in a manner that can achieve widespread use by being compact and by simplifying the electronic access to and storage of such information.

SUMMARY OF THE INVENTION

In accordance with the present invention there is provided a computer diskette system that utilizes a pair of partial disks which mate together to form a complete data storage disk that can be read in a conventional manner by a computer disk drive. The diskette system includes a cartridge having an internal space for holding the two partial disks when they are mated together. At least one of the partial disks is used to store data such as business contact information and for that purpose is interchangeable so that different partial disks containing different business contact information can be inserted into the cartridge.

In one aspect of the invention, the first partial disk has formatting information stored thereon that identifies the location of data files stored on the second partial disk. The formatting information can be, for example, a file allocation table that can be read in a conventional manner by the type-of disk drive commonly found in personal computers. In this way, the second partial disk can be used to store business contact information as one or more preselected files that are common to all such partial disks and that information can then be retrieved in a conventional manner using the file allocation table contained on the first partial disk.

In another aspect of the invention, the first partial disk can be permanently housed within the cartridge or can be interchangeable so that a different partial disk having a different file allocation table can be used. This permits the diskette system to be used for different purposes; for example, for providing business contact information or for providing confidential access information such as codes that enable access to commercial services.

In another aspect of the invention, the second partial disk has a semi-circular shape and is designed to fit into a 3½ inch square diskette cartridge. This results in the second partial disk having approximately the same length and width as a standard sized business card, making the partial disk easy to carry and distribute to others.

In yet another aspect of the invention, the diskette system includes a hub rotatably mounted to the cartridge. The first partial disk can be permanently or removably connected to the hub and the hub has an interlocking portion that is adapted to mate with a corresponding interlocking portion of the removable partial disk.

BRIEF DESCRIPTION OF THE DRAWINGS

Preferred exemplary embodiments of the present invention will hereinafter be described in conjunction with the appended drawings, wherein like designations denote like elements, and:

FIG. 2 is a cross-sectional exploded view taken along the 2—2 line of FIG. 1;

FIG. 3 is a cross-sectional view as in FIG. 2 showing the components of the computer diskette as they would be connected together for use in a computer disk drive;

FIG. 6 is an exploded view of an alternative embodiment of the computer diskette system of the present invention;

FIG. 7 is a cross-sectional exploded view taken along the 7-78 line of FIG. 6; and FIG. 8 is a cross-sectional view as in FIG. 7 showing the components of the computer diskette as they would be connected together for use in a computer disk drive.

DETAILED DESCRIPTION OF THE PREFERRED EMBODIMENTS

Figure 1:
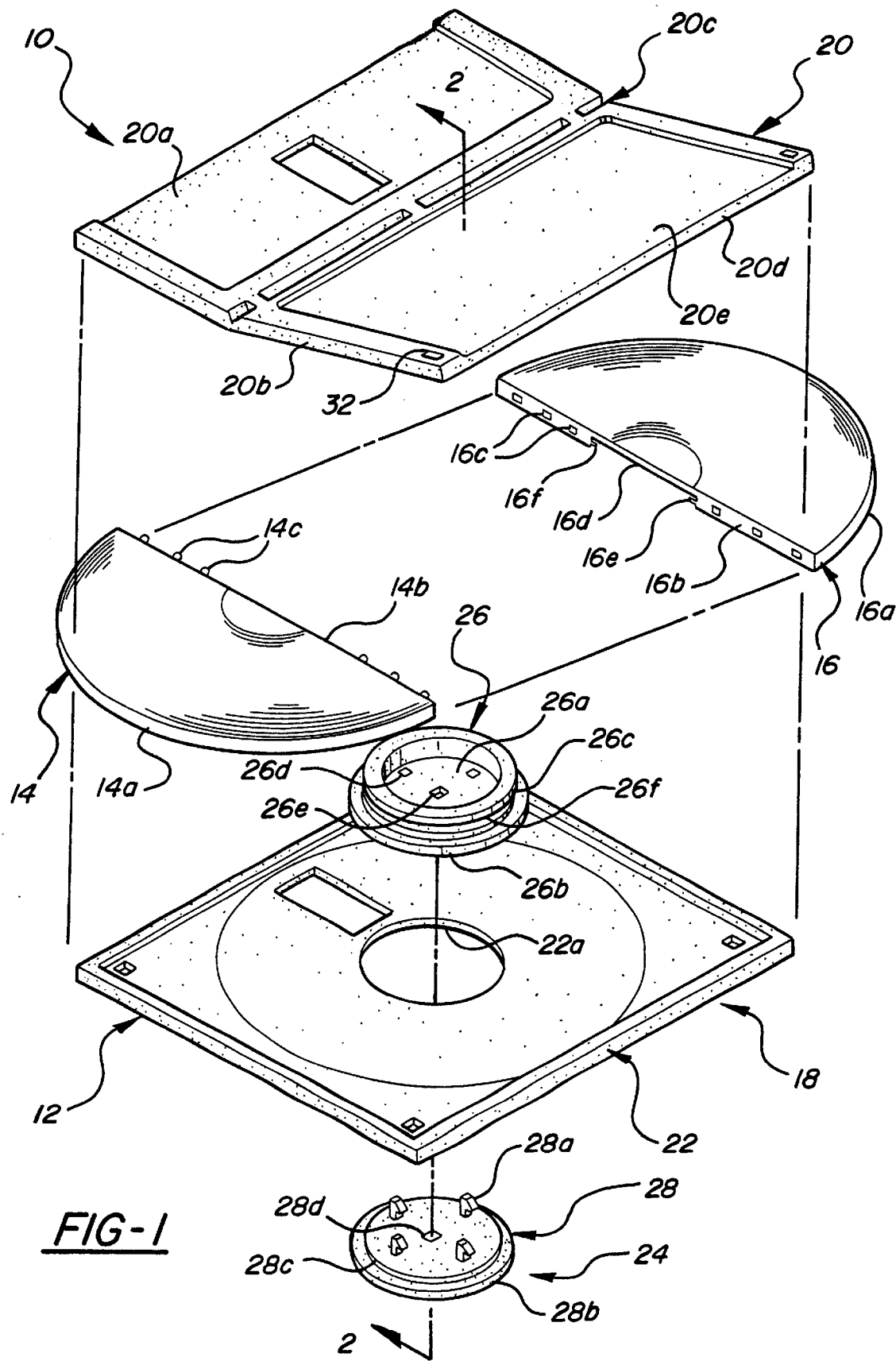
FIG. 1 is an exploded view of a computer diskette system of the present invention.

As shown in FIGS. 1–3, a computer diskette system of the present invention, designated generally as 10, includes a diskette 12, a first partial data storage disk 14, and a second partial data storage disk 16. Diskette 12 includes a cartridge 18 having an upper half 20 and lower half 22, and a hub 24 formed from a top cog 26 and a bottom cog 28. In general, partial disks 14 and 16 connect together to form a complete data storage disk which can be snapped onto hub 24 to retain the partial disks within the cartridge. The cartridge and its contents can then be inserted into a conventional 3½ inch disk drive. The first partial disk 14 contains formatting information that permits conventional access to the information stored on the second partial disk 16. The partial disks are both semi-circular in shape and have approximately the same length and width as a business card, making them easily transportable.

The upper half 20 of cartridge 18 has a main portion 20a permanently secured at its periphery to the lower half 22. The upper half 20 also includes an access door 20b that provides an access opening into an internal space 30 within cartridge 18 to thereby allow insertion and removal of partial disks 14 and 16. Access door 20b is connected to the main portion 20a by a hinge 20c that permits access door 20b to swing between a closed position and an open position. As shown, hinge 20c is a live hinge formed as a part of molding upper half 20. To provide a positive closure of access door 20b, one or more clips (not shown) can be located at the ends of the free edge 20d of access door 20b. Of course, any other suitable hinge arrangement could be used, such as that disclosed in U.S. Pat. No. 4,628,388, issued Dec. 9, 1986 to H. Kawabe. Alternatively, access door 20b could comprise a separate piece that slides between open and closed positions.

Diskette 12 includes a recording lock 32 and a recess 20e in upper half 20 for printed instructions or other information. Although not shown, diskette 12 can also include various features commonly found on conventional floppy disks, including a spring-loaded shutter, a pair of opposed toroidal fabric liners, and a wiper tab. As is known, the shutter is normally biased into a position covering a read/write opening in both lower half 22 and the main portion 20a of upper half 20. The fabric liners can be located on the opposing inner surfaces of the upper and lower halves of cartridge 18 and the wiper tab can be located between the lower liner and the inner surface of the lower half 22 to urge the lower liner into engagement with the partial disks 14 and 16.

Hub 24 is rotatably mounted on lower half 22 of cartridge 18. Hub 24 is formed from top cog 26 and bottom cog 28 which are snap-fit together through an opening 22a in lower half 22. In particular, top cog 26 comprises a circular piece having a bottom wall 26a, a peripheral flange 26b, and an axially-extending cylindrical wall 26c that extends upwardly from bottom wall 26a. Located in bottom wall 26a and within the confines of cylindrical wall 26c are four equidistant holes 26d. These holes are sized to accept a corresponding set of four clips 28a that extend upwardly from bottom cog 28. At the base of bottom cog 28 is an outer circular flange 28b that is coextensive with flange 26b of top cog 26. The upper portion 28c of bottom cog 28 has a diameter that is slightly less than the diameter of opening 22a in lower half 22. Thus, when the top and bottom cogs are snapped together through opening 22a, the flanges 26b and 28b define an annular channel that holds hub 24 in place within opening 22a. As best seen in FIGS. 2 and 3, the lower surface 22b of cartridge 18 can have an annular recess about opening 22a, with the depth of the recess equal to the thickness of flange 28a. In this way, the base of bottom cog 28 can be substantially flush with the lower surface 22b of cartridge 18. At the center of the lower surfaces of cogs 26 and 28 are conventional openings 26e and 28d, respectively, to receive a drive post of a standard 3½ inch computer disk drive. Both top cog 26,and bottom cog 28 can be made from a resilient molded plastic.

Partial disk 14 is a semi-circular disk having an arcuate outer edge 14a and a rectilinear inner edge 14b. Similarly, partial disk 16 is a semi-circular disk having an arcuate outer edge 16a having the same radius as that of outer edge 14a of partial disk 14. Disk 16 also has a rectilinear inner edge 16b so that when disks 14 and 16 are mated together along their straight edges, they form a complete circular disk of standard diameter. To connect together, partial disk 14 has a number of connecting elements in the form of pins 14c that extend-out from edge 14b. Pins 14c have enlarged heads that are sized to snap into a corresponding number of recesses 16c located in edge 16b of partial disk 16. In addition to connecting the partial disks together, these pins help insure proper alignment of the closely spaced concentric tracks that extend from the magnetic media of one partial disk onto the magnetic media of the other partial disk. Of course, other types of connecting elements can be used as long as they provide sufficient alignment of the concentric tracks. Once the partial disks are snapped together to form a complete disk, that disk can then be inserted into diskette 12 through its access opening and then snapped onto hub 24.

To connect to hub 24, partial disk 14 has a semi-circular recessed region 14d formed in its lower surface. The extent of this region is defined by a circumferential wall 14e having a radially-inward extending lip 14f that mates with a corresponding channel 26f located about the outer circumference of cylindrical wall 26c of top cog 26. Lip 14f and channel 26f constitute interlocking portions of partial disk 14 and top cog 26, respectively, that mate together to allow partial disk 14 to be removably connected to hub 24. As with disk 14, partial disk 16 includes a recessed region 16d defined by a circumferential wall 16e having a radially-inward extending lip 16f that mates with channel 26f. Although, in the illustrated embodiment, a two-piece media (partial disks 14 and 16) is used along with hub 24, it will be appreciated that diskette 12 can also be used to accept single-piece interchangeable media.

Figure 4:
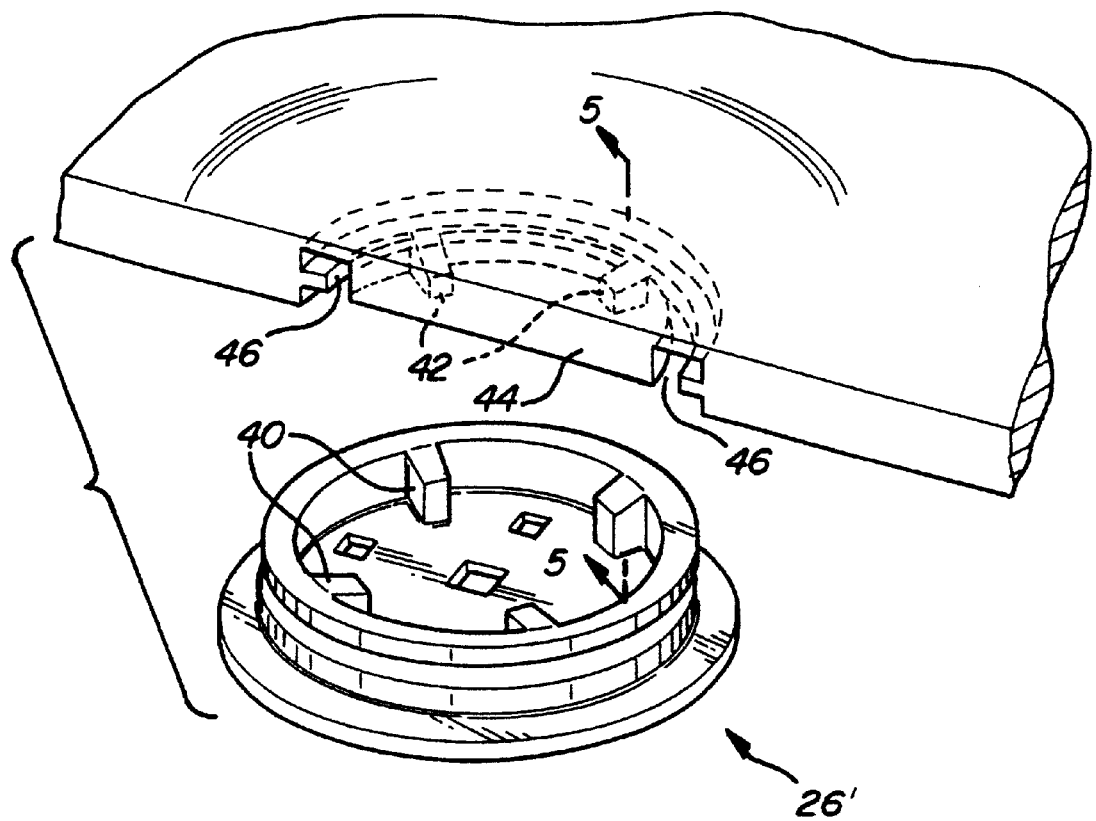
FIG. 4 is perspective view of a modified top cog and partial disk of the type used in the computer diskette of FIG. 1.
Figure 5:
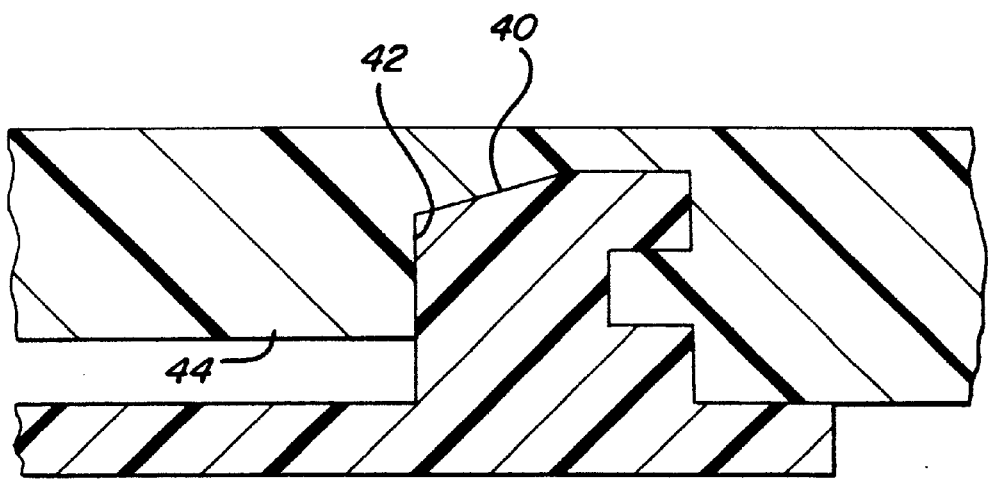
FIG. 5 is a cross-sectional view showing the top cog and partial disk of FIG. 4 connected together.

When placed into a computer disk drive, the partial disks are rotated by engagement of the disk drive's spindle or drive post with hub 24. It is therefore important that there not be any relative rotation between the hub and partial disks. Since the interlocking portions of the hub 24 and partial disks 14 and 16 may not be sufficient to prevent this relative rotation, the modified construction shown in FIGS. 4 and 5 can be used. In this embodiment, all of the components of the diskette system 10 of FIGS. 1–3 are present, except that the top cog and the partial disks are modified to include interlocking elements that prevent any relative rotation therebetween. In particular, the top cog 26' additionally includes four, radially-inward extending teeth 42 that mate with corresponding recesses 44 located in a downwardly extending central portion 46 of each of the partial disks. The interlocking of teeth 42 with recesses 44 prevent any slipping of the hub with respect to the partial disks when being driven in the computer disk drive. The downwardly extending portion 46 also creates an annular channel 48 that helps lock the partial disks onto the top cog 26'. Of course, other arrangements can be used to interlock hub 24 and the data storage media against relative rotation. For example, rather than using teeth 42, a spline could be used so that only minimal rotation of the data storage disk is required when fitting it onto the hub.

Partial disks 14 and 16 can be formed from a polycarbonate substrate with an iron oxide layer for the magnetic storage of digital information. As is known by those skilled in the art, to provide compatibility among floppy disk and disk drives made by different manufacturers, there now exists a number of ANSI standards that dictate many of the more critical dimensions of a standard 3½ inch floppy disk. Since partial disks 14 and 16 have a greater thickness than conventional magnetic disk media, the upper and lower halves of cartridge 18 can be made from a stiffer plastic so that their wall thickness can be reduced without reducing their structural integrity. In this way, the overall thickness of cartridge 18 can be kept within ANSI guidelines while the height of internal space 30 can be increased to accommodate the increased thickness of the magnetic disk media.

Preferably, partial disk 14 is double sided; that is, it includes an iron oxide layer on both its upper and lower surfaces. Partial disk 16 can also be double-sided. However, since a primary use of partial disk 16 is to distribute business-related information such as a person's name, business address, telephone number, and other such contact information, one side of partial disk 16 preferably includes printed information of the type found on a typical business card.

The use of partial disks 14 and 16 to store, distribute, and access business-related information and other data will now be described. In general, disk 14 is used to maintain formatting information, such as the file allocation table used by a computer when reading the diskette, and disk 16 contains data stored in preselected locations identified in the file allocation table. In this way, partial disk 16 can be used as a business card and the information stored thereon can be accessed in a conventional manner using the file allocation table stored on disk 14. As long as the data is stored in the locations identified in the file allocation table, any of a number of partial disks 16 containing different information can be used with a single disk 14. Thus, a recipient only need be given diskette 12 and partial disk 14 once and that person can then receive the "business card" partial disks 16 from anyone and access the information stored thereon using the single diskette 12 and partial disk 14.

Since the data is stored on partial disk 16 as one or more files, the data can be retrieved and then utilized or stored using any applicable commercially available program. For example, contact information could be retrieved and then stored in an electronic rolodex or some other contact management program. In some instances, this information may be imported directly into a database. In other instances, the data may need to be retrieved and then copied or reformatted for incorporation into the database.

Preferably, diskette system 10 is used along with a computer program that is designed to permit a user to take certain actions using the data on partial disk 16. For example, a recipient of someone else's "business card" disk 16 may decide that he or she wants to send an Internet email message to that person. To do so, the user could connect the "business card" disk 16 to partial disk 14, insert them into diskette 12, insert the diskette into the computer's disk drive, start the computer program, and then select the "email" command. The program then looks for a particular file on the diskette, which it would find at the location specified in the file allocation table stored on partial disk 14. The program then retrieves the person's email address and initiate the user's mail program to bring up a "new message" dialogue box with the person's email address already entered in the "To:" field.

If, instead of sending email, the user wanted to visit the person's website, then upon executing the program, the user would select the "go to website" command and the program then retrieves the URL stored on diskette and then initiates the user's Internet browser and automatically directs the browser to the URL. For computers so equipped, the program can be used to send faxes to the person from the user's computer and even to initiate a voice telephone call.

Preferably, the program is distributed along with partial disk 14 and diskette 12, either by being stored on disk 14 or, if necessitated by file size, a separate floppy disk or CD-ROM. Alternatively, the computer program could be distributed in other ways, such as over the Internet.

Rather than being used as a business card, partial disk 16 can also be used for other purposes, such as for storing passwords that provide access to on-line databases or other services. For this purpose, a different partial disk 14 with a different file allocation table would be used so that the computer could properly access the passwords on disk 16. A computer program could then be used to initiate a connection with an on-line service and automatically sign on using the stored password. If desired, the same program that is used for accessing the "business card" disk 16 could be used for this purpose as well.

A number of variations of the disclosed embodiment should now become apparent. For example, the shapes of the partial disks can be other than semi-circular, as long as they connect together to form a substantially complete computer data storage disk. Alternatively, where the size of the media is not a constraint, a single-piece media can be used with diskette 12 rather than the partial disks. Also, partial disk 14 can be permanently attached or even unitary with hub 24.

One such variation is disclosed in FIGS. 6–8. Shown therein is a computer diskette system 50 that includes a diskette 52 that includes a partial data storage disk 54 rotatably mounted therein. A second partial data storage disk 56 can be removably connected to partial disk 54. Diskette 52 also includes a cartridge 58 having an upper half 60 and a lower half 62 and a hub 64 formed from a top cog 66 and a bottom cog 68. Unlike the first embodiment shown in FIGS. 1–3, partial disk 54 is designed to be permanently retained with cartridge 58. Also unlike the first embodiment, partial disk 56 is clipped into a recessed area 54a of disk 54, rather than using pins to connect it along its linear edge.

Cartridge 58 can be constructed identically to cartridge 18 of FIGS. 1–3. Hub 64 is mounted on lower half 62 of cartridge 58 in the same manner as hub 24 of FIGS. 1–3; that is, by virtue of a pair of flanges 66a and 66b of the top and bottom cogs, respectively. The cogs are connected together using a single clip 66b on top cog 66 and a set of three clips 68b on bottom cog 68. As best seen in FIGS. 7 and 8, clips 68b are used to securely mount partial disk 54 onto hub 64. In particular, clips 68b pass through a set of corresponding holes 66c in top cog 66 and then through a second set of corresponding holes 54b in partial disk 54.

As shown, partial disk 54 is a circular disk containing a semi-circular recessed area 54a designed to receive partial disk 56. To hold disk 56, partial disk 54 includes a diametral lip 54c and a short clip 54d located opposite lip 54c at the periphery of disk 54. Partial disk 56 is a semi-circular disk having magnetic media on its upper surface 56a and, if desired, printed information on its lower surface 56b. To mate with partial disk 54, disk 56 has a shoulder 56c that extends along its linear edge and a small recess 56d located on its upper surface 56a at its periphery. Partial disk 56 can then be installed onto disk 54 by slipping shoulder 56c under lip 54c and snapping clip 54d over the peripheral edge of disk 56 and into recess 56d. Clip 54d securely holds shoulder 56c in place under lip 54c and, by fitting into recess 56d, helps insure proper alignment of the concentric tracks on partial disks 54 and 56.

As will be appreciated by those skilled in the art, other features of diskette system 50 not expressly described can be implemented as discussed in connection with the embodiments of FIGS. 1–5.

It will thus be apparent that there has been provided in accordance with the present invention a computer diskette system which achieves the aims and advantages specified herein. It will of course be understood that the foregoing description is of preferred exemplary embodiments of the invention and that the invention is not limited to the specific embodiments shown. Various changes and modifications will become apparent to those skilled in the art and all such variations and modifications are intended to come within the scope of the appended claims.

I claim:

1. A computer diskette system for use by a computer disk drive, comprising:

a removable data storage media;

a cartridge having an upper half and a lower half, wherein at least a portion of one of said halves is movable between an open position which permits access into an internal space within said cartridge and a closed position which inhibits access into said internal space; and a hub rotatably mounted on said lower half of said cartridge, said hub including a lower portion having an opening therein for receiving a drive post of the disk drive when said cartridge is inserted into the disk drive, said hub further including an upper portion having a first interlocking element adapted to positively engage a corresponding interlocking element of said removable data storage media to thereby prevent relative rotation between said hub and removable data storage media;

wherein said interlocking elements are disposed on said hub and said removable data storage media such that said removable data storage media must be rotationally aligned with said hub prior to mating of said interlocking elements.

2. A diskette adapted to contain a plurality of data storage media, one of the data storage media having the form of a partial disk and adapted to be a removable data storage media; said diskette being adapted for use by a computer disk drive to access information stored on the removable data storage media, said diskette comprising:

a cartridge having an upper half and a lower half, wherein at least a portion of one of said halves is movable between an open position which permits access into an internal space within said cartridge and a closed position which inhibits access into said internal space;

a hub rotatably mounted on said lower half of said cartridge, said hub including a lower surface having an opening therein for receiving a drive post of the disk drive, said hub further including an upper surface having a first interlocking portion adapted to positively engage a corresponding interlocking portion of the removable data storage media; and a second partial disk having a first, generally arcuate edge and a second edge that is adapted to mate with a corresponding edge of the removable data storage media.

3. A diskette as defined in claim 2, wherein said second partial disk is secured to said hub.

4. A diskette as defined in claim 2, wherein said second partial disk is removably connectable to said hub via said first interlocking portion.

5. A diskette as defined in claim 2, wherein said second partial disk has formatting information stored thereon that identifies the location of data store on the removable data storage media.

6. A diskette as defined in claim 2, wherein said hub comprises a top and a bottom cog connected together.

7. A diskette as defined in claim 6, wherein said hub is rotatably mounted to said lower half of said cartridge via an annular channel and wherein said top and bottom cogs each have a peripheral flange that together define said annular channel.

8. A diskette for use by a computer disk drive to access information stored on a removable data storage media contained within the diskette, comprising:

a cartridge having an upper half and a lower half, wherein at least a portion of one of said halves is movable between an open position which permits access into an internal space within said cartridge and a closed position which inhibits access into said internal space; and a hub rotatably mounted on said lower half of said cartridge, said hub including a lower surface having an opening therein for receiving a drive post of the disk drive when the cartridge is inserted into the disk drive, said hub further including an upper surface having a first interlocking portion adapted to mate with a corresponding interlocking portion of the removable data storage media;

wherein said first interlocking portion of said hub includes at least one radially-extending surface that mates with a corresponding radially-extending surface of the removable data storage media to prevent relative rotation between said hub and the removable data storage media.

9. A computer diskette system for use by a computer disk drive, comprising:

a data storage media having a generally circular shape;

a cartridge having au upper half and a lower half, wherein at least a portion of one of said halves is movable between an open position which permits access into an internal space within said cartridge and a closed position which inhibits access into said internal space; and a hub rotatably mounted on said lower half of said cartridge, said hub including a lower portion having an open therein for receiving a drive post of the disk drive, said hub further including an upper portion having a first interlocking element adapted to positively engage a corresponding interlocking element of said data storage media to thereby prevent relative rotation between said hub and removable data storage media;

wherein said interlocking elements are disposed on said hub and said data storage media such that said data storage media must be rotationally aligned with said hub prior to mating of said interlocking elements.

10. A diskette as defined in claim 9, wherein said data storage media includes an iron oxide layer for magnetic storage of digital information.

11. A computer diskette system for use by a computer disk drive, comprising:

a data storage media having a generally circular shape of approximately 3.5 inches in diameter;

a cartridge having an upper half and a lower half, wherein at least a portion of one of said halves is movable between an open position which permits access into an internal space within said cartridge and a closed position which inhibits access into said internal space; and a hub rotatably mounted on said lower half of said cartridge, said hub including a lower surface having an opening therein for receiving a drive post of the disk drive, said hub further including an upper surface having a first interlocking portion adapted to positively engage a corresponding interlocking portion of said data storage media to thereby prevent relative rotation between said hub and removable data storage media;

further comprising said data storage media, wherein said data storage media includes a partial disk adapted to be a removable data storage media, and a second partial disk, said partial disk and said second partial disk forming said circular data storage media.

12. A diskette as defined in claim 11, wherein said partial disk and said second partial disk each include an iron oxide layer for magnetic storage of digital information and wherein said partial disk and said second partial disk are positioned when mated together so that tracks of magnetic media extend from said partial disk to said second partial disk.

* * * * *